United States Patent [19]

Stammler et al.

[11] 3,779,822

[45] Dec. 18, 1973

[54] COMPOSITE PROPELLANT CONTAINING ORGANIC AMINE PERCHLORATES

[75] Inventors: Manfred Stammler, Carmichael; Willfred G. Schmidt, Sacramento; Rolf S. Bruenner, Orangevale, all of Calif.

[73] Assignee: Aerojet - General Corporation, Azuse, Calif.

[22] Filed: July 22, 1963

[21] Appl. No.: 297,179

[52] U.S. Cl. .................. 149/19.4, 149/74, 149/109
[51] Int. Cl. .............................................. C06d 5/06
[58] Field of Search ...................... 149/19, 109, 74, 149/75

[56] References Cited
UNITED STATES PATENTS

| | | | |
|---|---|---|---|
| 2,978,509 | 4/1961 | Frankel | 260/583 |
| 3,024,143 | 3/1962 | Sammons et al | 149/19 |
| 3,024,144 | 3/1962 | Sammons | 149/19 |
| 3,027,282 | 12/1962 | Schamons | 149/19 |
| 3,031,838 | 5/1962 | Doss | 149/109 |
| 3,031,839 | 5/1962 | Larson | 149/109 |
| 3,066,168 | 11/1962 | Stengel | 260/583 |
| 3,068,129 | 12/1962 | Schoffel | 149/19 |

*Primary Examiner*—Benjamin R. Padgett
*Attorney*—Edward O. Ansell and D. Gordon Angus

EXEMPLARY CLAIM

1. A solid propellant composition comprising from about 5 percent to about 55 percent by weight of an organic cross-linked resin binder and from about 95 percent to about 45 percent by weight of an oxidizing composition comprising a compound having the general formula $$(R)_m (NH_{4-m}X)_n$$

wherein R is an organic radical having a valence equal to $n$; X is selected from the group consisting of perchlorate and nitrate; $n$ is an integer of from 1 to 2; and $m$ is an integer of from 1 to 3 when $n$ equals 1, and $m$ is equal to 1 when $n$ equals 2.

7 Claims, No Drawings

COMPOSITE PROPELLANT CONTAINING ORGANIC AMINE PERCHLORATES

This invention relates to novel chemical compounds and to their use as oxidizers in solid propellant formulations.

It is the object of this invention to prepare novel chemical compounds. It is still another object of this invention to prepare novel compounds which are especially advantageous for use as oxidizers in solid propellant formulations. These and other objects of this invention will be apparent from the detailed description which follows.

Previously there has been employed in solid propellants, oxidizer compounds such as ammonium perchlorate. However, it has been found that these compounds do not provide as high a burning rate and specific impulse as is desirable in the modern solid fuel rockets. The preparation of solid propellants possessing increased burning rate and specific impulse has assumed greater importance in recent years, in view of the national effort to explore the outer reaches of the earth's atmosphere and to land scientific instruments and human beings on the moon and other planets in our solar system.

Previous attempts to solve these problems by employing higher energy oxidizers in lieu of ammonium perchlorate have not been entirely successful because these oxidizers have been found to be very sensitive to impact, rendering them dangerous to handle.

It has now been found according to our invention that solid propellants possessing the desired improved burning rate and specific impulse may be obtained by replacing the ammonium perchlorate previously used with certain novel organic perchlorates and nitrates. These novel oxidizers do not possess the low impact sensitivity previously associated with high energy oxidizers.

The novel perchlorates and nitrates of the invention are those compounds having the following general formula

wherein R is a monovalent or divalent organic radical having a valence equal to $n$; $n$ is an integer from 1 to 2; $m$ is an integer of from 1 to 3 when $n$ is 1, and $m$ is equal to 1 when $n$ is 2; and X is perchlorate ($ClO_4$) or nitrate ($NO_3$). In the above formula R may be, for example, hydrocarbyl, such as alkyl, alkaryl, aralkyl; hydrocarbylene, such as alkylene and arylene; monovalent heterocyclic, divalent heterocyclic, or the like. Normally, R is a monovalent or divalent organic radical having from one to about 20 carbon atoms per moiety. As is apparent from the above formula, when R is monovalent, $n$ equals 1; and when R is divalent, $n$ equals 2.

Typical compounds within the scope of this invention are methyl amine perchlorate, methyl amine nitrate, dimethyl amine perchlorate, trimethyl amine perchlorate, diamino tetrazine diperchlorate, ethylene diamine diperchlorate, ethylene diamine dinitrate, phenylene diamine dinitrate, phenyl amine nitrate, diphenylamine nitrate, tetrazole amine nitrate, toluidine perchlorate, triazole amine nitrate, phenylene triamine triperchlorate, N-methylaniline perchlorate, decylamine nitrate, secondary butyl amine perchlorate, pentamethylene diamine diperchlorate, and tertiary butyl amine perchlorate.

Preferred compounds within the scope of the foregoing formula are those wherein R is monovalent heterocyclic; or where R is a divalent organic radical, that is, $n = 2$. Preferred heterocyclic R groups are those containing four to six atoms in the ring, with from one to above four of the ring atoms being nitrogen and the balance carbon. These preferred compounds have been found to possess an especially high impact sensitivity.

The excellent impact sensitivity of the compounds of this invention may be seen in the following table.

TABLE I

| Compound | Impact Sensitivity cm/2kg |
|---|---|
| hydrazine perchlorate | 2 |
| methyl amine perchlorate | 20 |
| dimethyl amine perchlorate | 22 |
| trimethyl amine perchlorate | 25 |
| ethylene diamine diperchlorate | 35 |
| aminotetrazole nitrate | 65 |

In the Table, the numerical values refer to the vertical height in centimeters at which a 2kg weight when dropped with detonate a 10 mg sample 50 percent of the time.

These novel organic amine perchlorates and nitrates are prepared by reacting nitric or perchloric acid with an organic amine in accordance with the following general reaction equation

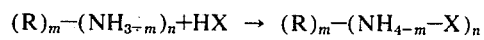

wherein R, $m$, $n$ and X are as defined above. In the equation shown, HX refers to perchloric acid or nitric acid. The above reaction is normally carried out at a temperature of from about −10°C. to about +10°C. Higher temperatures can be used but tend to produce oxidation of the amine reactant unless large quantities of a diluent is employed. In the above reaction the ingredients are normally employed in about stoichiometric proportions although greater or lesser amounts of the reactants may be used. Preferably, although not necessarily, the reaction is carried out in an inert polar or nonpolar diluent such as the alkanols, ketones, hydrocarbons, halohydrocarbons and the like. If a solvent is used, the weight ratio of amine to diluent is usually within the range from about 1 to 1 to about 1 to 10. Isolation of the compounds from unused reactants and solvent is achieved in conventional manner by evaporation, extraction, or crystallization.

The above reaction proceeds readily under normal atmospheric pressure but higher or lower pressure can be utilized in some cases to more closely control the reaction rate.

The following examples illustrate the method of preparing the novel compounds of our invention. The parts are by weight unless otherwise indicated.

EXAMPLE I

To 30 parts of ethylene diamine dissolved in 40 parts of methanol was added 69 parts of a 70 percent aqueous solution of perchloric acid at 5°C. After several minutes, most of the methanol was removed under vacuum. The remaining solution contained crystals which were recovered by filtration. The crystals were then dried. Analysis of the crystals showed them to be ethylene diamine diperchlorate having a melting point of 265°C.

EXAMPLE II

To one mole of aminotetrazole was added one mole of concentrated nitric acid at −10°C. The reaction proceeded as in Example I, and the product was recovered by filtration. The tetrazole amine nitrate obtained had a melting point of 165°C.

Following the procedure of Example I, the following compounds were obtained.

TABLE II

| Example No. | Compound | Melting Point °C. |
|---|---|---|
| III | methylamine perchlorate | 255 |
| IV | dimethylamine perchlorate | 180 |
| V | trimethylamine perchlorate | 280 |
| VI | propylamine perchlorate | 170 |
| VII | Isopropylamine perchlorate | 152 |
| VIII | n-butylamine perchlorate | 189 – 192 |
| IX | s-butylamine perchlorate | 112 – 115 |
| X | t-butylamine perchlorate | 140 |

The novel nitrates and perchlorates set forth above are particularly useful as oxidizers in solid propellant formulations. These novel compounds may be used as partial or complete replacement for conventional oxidizers such as the inorganic oxidizers; i.e., ammonium perchlorate, ammonium nitrate, potassium nitrate, calcium nitrate, etc. Preferably up to 50 percent and more preferably from 1 to about 30 percent, of the total weight of oxidizer in the propellants of our invention are the above-described organic amine perchlorates and/or nitrates. Such propellant formulations normally include, in addition to the oxidizer a cross-linked resin binder.

In the practice of our invention a wide variety of organic resin binders may be used. These binders are substantially free of voids, pores or open cells. Typical of such binders are the polyurethane polymers prepared by reacting a compound having two or more active hydrogen groups as determined by the Zerewitinoff method and capable of polymerizing with an isocyanate; with an organic compound having as its sole reactive groups, two or more isocyanate groups. The compound having the active hydrogen groups is preferably an organic compound having as its sole reactive groups, hydroxyl or thiol groups. These polyurethane binders are more fully disclosed in Assignee's co-pending U. S. Pat. Application, Ser. No. 829,182, filed on July 20, 1959, now U.S. Pat. No. 3,132,976. Any of the polyurethanes disclosed in this co-pending application are useful in the propellants of our invention.

The isocyanate starting materials for the polyurethane binders are preferably diisocyanates but not necessarily so since other polyisocyanates such as triisocyanates may be employed if desired. The preferred diisocyanate compounds are those having the formula OCN — A — NCO wherein A is a saturated or unsaturated divalent organic radical. The group A may be entirely hydrocarbon or may be substituted by groups unreactive with isocyanate or hydroxyl groups such as, for example, halogen or ether groups. In the above formula A normally contains from one to about 20 carbon atoms. The diisocyanate compounds particularly suitable as reactants for the preparation of poly-urethane binders are alkane diisocyanate such as ethylene diisocyanate and decamethylene diisocyanate. Other suitable diisocyanates include the aromatic diisocyanate such as 2,4-tolylene diisocyanate, 2,6-tolylene diisocyanate and 4,4'-diphenylmethane diisocyanate.

The preferred hydroxy starting compounds for the polyurethane binders are dihydroxy compounds having the general formula HO — $R_1$ — OH wherein $R_1$ is a divalent organic radical. Dihydroxy compounds particularly suitable as reactants for the polyurethane binders of this invention include alkane diols having a chain length of from two to about 20 carbon atoms such as ethylene glycol.

Other suitable dihydroxy compounds are polyesters such as those obtained by the reaction of a dihydric alcohol with a dicarboxylic acid. The polyesters most suitable for the purpose of this invention are those having a molecular weight from about 1,000 to about 2,500. In addition to the polyesters, polyalkylene ether polyols such as polyethylene ether glycols, polypropylene ether glycols, and copolymers of ethylene oxide and propylene oxide may be used. Preferably, the polyalkylene ether polyols of this invention have two or three hydroxy groups per molecule and have a molecular weight of from about 400 to about 10,000.

In the preparation of the polyurethane binders there may be optionally included cross-linking agents such as glycerol monoricinoleate and trimethylolpropane. Preferably, the cross-linking agent contains three or four hydroxy groups per molecule and have a molecular weight of from about 80 to about 1,000.

While polyurethane binders are preferred for purpose of this invention, it is within the scope of the invention to employ any other solid propellant binder in our novel propellants. For example, resinous binders such as rubbers, polysulfides, and other combustible polymeric organic materials may be used. Thus, it is within the scope of this invention to employ as propellant binders the phenol-aldehyde resins, polyester resins, acrylate resins, and the carboxy-terminated polyolefin resins. Typical of suitable rubber and polysulfide propellant binders are those set forth in U. S. Pat. No. 3,012,866, issued Dec. 12, 1961. Suitable polyester resins are disclosed in U. S. Pat. No. 3,031,288, issued Apr. 24, 1962.

Still other suitable solid propellant binder materials are those disclosed in U. S. Pat. No. 2,479,828, British Pat. No. 579,057, and the low molecular weight isoolefin polyolefin copolymers disclosed in Assignee's co-pending Application Ser. No. 202,351 filed June 8, 1962, now U.S. Pat. No. 3,399,087.

The various additives may be employed in preparing the preferred propellants of this invention. Likewise, various processing conditions may be followed and various proportions of the ingredients employed.

Various additives may be employed in preparing the preferred polyurethane binders of this invention. For example, plasticizers familiar to those skilled in the art, such as, isodecyl pelagonate, bis-2,2-dinitropropyl acetal, bis-2,2-dinitro-propyl formal, dioctyl azelate, etc. may be utilized. The plasticizer gives plastic properties to the propellant but does not enter into the polymerization reaction. Also, catalysts for the polyurethane reaction such as triethylamine and other tertiary amines; ferric acetylacetonate and other metal acetylacetonates such as vanadyl acetylacetonate, etc.; boron trifluoride, etc., can be employed if desired. The catalysts can be employed in quantities within the range from mere traces up to amounts equivalent to about one percent by weight of the total propellant composition, and even higher. Normally amounts of from about 0.02 to about 0.10 percent by weight, on a total weight basis, are employed.

The polyurethane polymerization reaction may be carried out either in a suitable solvent or in the absence of a solvent. The solvent may be present in such great excess as to form a solution of the monomers or it may be used in relatively small quantities. Suitable solvents are those in which the various ingredients of the reaction mixture are soluble, such as 4-nitrazapentenoate, dioxane, dimethylphthalate, etc.

Burning rate modifiers and other additives such as antioxidants, wetting agents, anti-foaming agents, etc., can be employed if desired, in the formulation of our novel propellants. In this connection, we have discovered that copper chromite and finely divided carbon black, when utilized in small quantities (comprising preferably not greater than 1 percent, of the total propellant weight) are useful for increasing the burning rate of the propellant. We have also found certain well-known wetting agents, such as lecithin, to be useful processing aids in the preparation of our novel propellants. Various additives other than those specifically mentioned can be employed, in minor amounts, within the scope of our invention. For example, phenyl beta-naphthylamine can be utilized in very small quantities as an antioxidant.

Because higher temperatures tend to produce shrinkage and internal strains, it is preferable to carry out the cure of the propellant at temperatures in the range of from about 70°F. to about 180°F. Within this range the reaction rate is sufficiently rapid for economical production. Yet the temperature is not so high as to produce shrinkage and internal stresses which must be avoided at all costs — especially in the case of large solid propellant motors.

Those skilled in the art will appreciate the fact that heating and cooling steps can be incorporated into our propellant processing procedure to attain optimum operating conditions for producing a given specific propellant. Likewise, various techniques which may serve to optimize the processing procedure or improve the quality of the product, e. g., vacuumizing the mixture during certain phases of the operation, can be employed if desired.

The various processing steps can be carried out with standard equipment well-known to those skilled in the art as suitable for the purpose. A mixer which we have found to be particularly effective for mixing our propellant ingredients, however, is that known commercially as the P mixer. The P mixer is manufactured by Baker-Perkins, Inc., of Saginaw, Michigan, and it can be equipped with facilities for heating, cooling, and vacuumizing propellant batches during mixing, when such operations are desired.

There are many ways of processing the various ingredients within the scope of this invention in the formulation of propellants therefrom, and these procedures may be readily determined by those skilled in the art, depending on the precise binder, plasticizer, etc., selected and size of the batch to be prepared. In preparing polyurethane propellants, the following is a preferred order of addition: the combination of plasticizer, with the diol, metal fuel and cross-linker in the mixer; addition of the burning rate modifiers (such as copper chromite and carbon black) during addition of the oxidizer; and addition of the curing catalyst (such as ferric acetylacetonate) along with addition of the diisocyanate. Modifications of the above methods of introducing the additives, such as, for example, addition of the wetting agents to the diol prior to introduction into the mixer, are varied and many. Likewise, there are many techniques for processing the major components in the preparation of our novel propellants. For example, the diol can first be mixed with the aluminum oxide and then with the inorganic oxidizer, after which the diisocyanate can be added, along with the catalyst and cross-linker.

After the propellant batch has been mixed to substantially uniformity, it is cast, extruded, or compression-formed to the desired shape and cured at a temperature preferably within the range from about 70°F. to about 180°F. As pointed out above, the propellant mixture can be cast directly into a rocket chamber lined with an inert liner material and polymerized (cured) therein if this procedure appears to be desirable. It is within the scope of the invention to employ metal fuels, such as aluminum and beryllium in an amount up to about 20 percent by weight of the propellant and more preferably in quantities from about 1.0 percent to about 18 percent by weight of the propellant. The propellant binder is preferably employed in a proportion within the range from about 5 to about 55 percent and the total oxidizing salt in an amount within the range from about 95 percent to about 45 percent by weight.

The term binder when used herein to denote a polyurethane binder includes not only the diol (or equivalent) and diisocyanate (or equivalent) reaction product but any cross-linker present as well.

The proportions of the ingredients which go to make up the binder, or as it is sometimes called, fuel, can vary through wide ranges, depending on the properties desired in the propellant and the specific reactants employed. Although stoichiometric proportions of hydroxy and isocyanate components can be employed in the preparation of polyurethane propellants, improved mechanical properties are obtained if a slight excess on the order of about 100 to about 115 equivalents of isocyanate or isothiocyanate containing monomer is present in the fuel mixture for every 100 equivalents of hydroxy or thiol containing monomer therein.

There can, of course, be more than one isocyanate compound or equivalent, as well as more than one hydroxy compound or equivalent, in the fuel mixture, in which case the calculation of excess isocyanate over hydroxy groups is based upon the total amounts of all pertinent compounds present. For example, where the cross-linker is a polyhydroxy compound the excess of isocyanate compound (or equivalent) is calculated as an excess over the amount of diol (or equivalent) plus the amount of cross-linker. The relative proportions of diol and cross-linker can vary through wide ranges so long as a cross-linked structure is obtained in the fuel.

The various additives and minor components of the propellants (these ingredients other than the binder) normally comprise a very small percentage of the total propellant weight. Thus, they will usually be present in combined amount not greater than that corresponding to about 10 percent (and preferably about 4 or 5 percent) of the total propellant weight.

The following examples are included for purpose of illustrating the novel processes and propellant compositions of our invention. Applicants wish to emphasize that these examples are intended for illustrative purposes only and that they should not be construed as limitative of the scope of the invention. In the examples, the parts are by weight unless otherwise indicated.

EXAMPLE XI

To a mixer is added 4.43 parts isodecyl pelargonate, 1.22 parts polypropylene ether glycol, 8.29 parts of a triol having a molecular weight of about 4,000 and being the addition product of ethylene oxide to trimethylol propane, 0.04 parts triethanol amine, 1.0 parts copper chromite, 14 parts aluminum, 70 parts ammonium perchlorate, 0.20 parts lecithin and 0.03 parts ferric acetylacetonate. After thorough mixing, 0.79 parts of tolylene diisocyanate are added. The blended mixture is cast in a motor casing and cured at 130°F. for 72 hours.

Motor firing showed this propellant to have a specific impulse ($I_s$) of 246.8.

When the foregoing propellant is duplicated using as oxidizer 52.5 parts ammonium perchlorate and 17.5 parts methylamine perchlorate (70.0 parts total oxidizer), in lieu of 70.0 parts ammonium perchlorate, $I_s$ was 248.2.

EXAMPLE XII

The following propellants were prepared according to the procedure of Example XI.

| Ingredient | Propellant A | Propellant B | Propellant C |
| --- | --- | --- | --- |
| Methylamine perchlorate | | 10.00 | |
| Ethylene diamine diperchlorate | | | 10.00 |
| Ammonium perchlorate | 70.00 | 60.00 | 60.00 |
| Aluminum | 14.00 | 14.00 | 14.00 |
| Copper chromite | 1.00 | 1.00 | 1.00 |
| Lecithin | 0.20 | 0.20 | 0.20 |
| Ferric acetylacetonate | 0.03 | 0.03 | 0.03 |
| Isodecyl pelargonate | 4.60 | 4.60 | 4.60 |
| Polypropylene ether glycol | 0.90 | 0.90 | 0.90 |
| Trimethylol propane ethylene oxide adduct (MW = 4000) | 8.50 | 8.50 | 8.50 |
| Tolylene diisocyanate | 0.77 | 0.77 | 0.77 |
| Total | 100.00 | 100.00 | 100.00 |

The burning rates of the above propellants were measured at 1,000 psia. The data obtained are tabulated below.

TABLE III

| Propellant | Burning rate in./sec. |
| --- | --- |
| A | 0.70 |
| B | 1.30 |
| C | 1.05 |

From these results, it is apparent that the oxidizers of this invention substantially increase the burning rate of solid propellants.

EXAMPLE XIII

Following the procedure of Example XI, the following propellants were also prepared.

| Ingredient | Propellant D | Propellant E |
| --- | --- | --- |
| Methylamine perchlorate | | 17.50 |
| Ammonium perchlorate | 70.00 | 52.50 |
| Aluminum | 14.00 | 14.00 |
| Copper chromite | 1.00 | 1.00 |
| Lecithin | 0.20 | 0.20 |
| Ferric acetylacetonate | 0.03 | 0.03 |
| Bis-dinitropropyl acetal | 4.60 | 4.60 |
| Polypropylene ether glycol | 0.90 | 0.90 |
| Trimethylol propane-ethylene oxide adduct (MW = 4,000) | 8.50 | 8.50 |
| Tolylene diisocyanate | 0.77 | 0.77 |
| Total | 100.00 | 100.00 |

The specific impulse of propellant D was found to be 246.8, and that of Propellant E, 248.5.

The following are other propellant formulations employing the novel oxidizers of this invention.

EXAMPLE XIV

| Ingredients | Weight Percent |
| --- | --- |
| Ethylene diamine diperchlorate | 76.00 |
| Polypropylene glycol (molecular weight 1800 – 1900) | 16.67 |
| 2,4-toluene diisocyanate | 2.75 |
| Glycerol monoricinoleate | 2.05 |
| Di-2-ethylhexyl azelate | 2.39 |
| Lecithin | 0.05 |
| Ferric acetylacetonate | 0.09 |
| Total | 100.00 |

The above composition is cured to a rubbery solid propellant by curing for two days at 130°F.

EXAMPLE XV

| Ingredients | Weight Percent |
| --- | --- |
| Tetrazole amine nitrate | 55.00 |
| Powdered Aluminum | 20.00 |
| Liquid isobutylene-isoprene copolymer (prepared in accordance with copending application Ser. No. 202,351) | 15.60 |
| Polyisobutylene plasticizer | 3.20 |
| Dinitrosobenzene (curing agent) | 6.20 |
| Total | 100.00 |

Having fully described the invention, it is our intent to be limited only by the lawful scope of the appended claims.

We claim:

1. A solid propellant composition comprising from about 5 percent to about 55 percent by weight of an organic cross-linked resin binder and from about 95 percent to about 45 percent by weight of an oxidizing composition comprising a compound having the general formula $$(R)_{\overline{m}}(NH_{4-m} X)_n$$ 

wherein R is an organic radical having a valence equal to $n$; X is selected from the group consisting of perchlorate and nitrate; $n$ is an integer of from 1 to 2; and $m$ is an integer from 1 to 3 when $n$ equals 1, and $m$ is equal to 1 when $n$ equals 2.

2. A solid propellant composition comprising from about 5 to about 55 parts by weight of a cross-linked polyurethane resin binder which comprises the reaction product of the compound having at least two active hydrogen groups as determined by the Zerewitinoff method and capable of polymerizing with an isocyanate, and an organic compound having as its sole reactive groups at least two isocyanate groups; and from about 95 parts to about 45 parts by weight of an oxidizer composition comprising a compound having the general formula $$(R)_{\overline{m}}(NH_{4-m} X)_n$$ 

wherein R is an organic radical having a valence equal to $n$; X is selected from the group consisting of perchlorate and nitrate; $n$ is an integer of from 1 to 2; and $m$ is an integer from 1 to 3 when $n$ equal 1, and $m$ is equal to 1 when $n$ equals 2.

3. A solid propellant composition comprising from about 5 to about 55 parts by weight of a cross-linked resin binder and from about 95 to about 45 parts by weight of an oxidizer composition comprising ethylene diamine diperchlorate.

4. A solid propellant composition comprising from about 5 to about 55 parts by weight of an organic cross-linked resin binder and from about 95 to about 45 parts by weight of an oxidizer composition comprising tetrazole amine nitrate.

5. The solid propellant composition of claim 1 where $n$ equals 2 and $m$ is equal to 1.

6. The solid propellant composition of claim 2 where $n$ equals 2 and $m$ is equal to 1.

7. A solid propellant composition comprising from about 5 to about 55 parts by weight of an organic cross-linked resin binder and from about 95 to about 45 parts by weight of an oxidizer composition comprising methyl amine perchlorate.

* * * * *